(12) United States Patent
Yamazaki et al.

(10) Patent No.: US 6,185,009 B1
(45) Date of Patent: *Feb. 6, 2001

(54) DATA PROCESSING APPARATUS AND METHOD

(75) Inventors: Katsuya Yamazaki; Shinichi Nakamura, both of Kawasaki; Chikara Sato, Hachioji; Kenji Kobayashi; Yasuo Fukazu, both of Tokyo; Masaaki Inoo, Yokohama, all of (JP)

(73) Assignee: Canon Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 08/792,575

(22) Filed: Jan. 30, 1997

(30) Foreign Application Priority Data

Feb. 2, 1996 (JP) .................................................. 8-039080

(51) Int. Cl.⁷ ...................................................... H04N 1/00
(52) U.S. Cl. ............................................ 358/404; 358/444
(58) Field of Search ................................... 358/448, 404, 358/444, 443; 711/162, 161, 159, 133, 135; 707/531, 500

(56) References Cited

U.S. PATENT DOCUMENTS

| | | | | |
|---|---|---|---|---|
| 4,250,560 | * | 2/1981 | Dethloff et al. | 707/531 |
| 4,994,926 | * | 2/1991 | Gordon | 358/407 |
| 5,659,401 | * | 8/1997 | Yoshida | 358/400 |

* cited by examiner

Primary Examiner—Jerome Grant, II
(74) Attorney, Agent, or Firm—Morgan & Finnegan LLP

(57) ABSTRACT

There is provided a data processing apparatus with an input device for inputting data, a memory for storing the data, and an output device for outputting the data stored in the memory by a predetermined operation. The data processing apparatus determines whether or not there is data in the memory not yet output by the output device after a predetermined time and, if so, transfers the data to another device. The data processing apparatus solves a conventional problem of data being stored in memory too long and preventing other processes from being performed because of a lack of remaining free capacity in memory.

19 Claims, 10 Drawing Sheets

DATA PROCESSING APPARATUS AND METHOD

BACKGROUND OF THE INVENTION

1. Field of the Invention

The present invention relates to data processing apparatus and method which perform a data process of, e.g., image data or the like.

2. Related Background Art

In recent years, there has been proposed that an image formation apparatus such as a digital copy machine or the like is connected to a local area network (LAN) or the like so as to use such the image formation apparatus as a printer and a scanner for a personal computer or a work station (WS) on the LAN.

In such a case where the image formation apparatus connected to the network is utilized as the printer, it is possible that a plurality of users simultaneously request printing of data. In such the case, the input data have been previously stored in a memory and then the stored data are sequentially printed. In such an operation, there has been known as one method that the stored data are sorted out by a sheet (or paper) post-process unit having a plurality of bins and then output according to necessity so as to prevent undesired mixing of recording sheets or papers.

On the other hand, there has been known as an another method that the data are kept stored in the memory, and the user operates the image formation unit or the like to start the printing of data so as not only to prevent the undesired mixing of the recording sheets but also to prevent that an another user can see the output recording sheets, whereby confidentiality can be improved.

However, in such the latter method, if the user does not instruct to output the data for a long time, it must be kept storing or holding the data in the memory. Therefore, there is some fear that another processes can not be performed for lack of vacant or free capacity in the memory.

SUMMARY OF THE INVENTION

An object of the present invention is to provide data processing apparatus and method which eliminate such an above-described conventional problem.

An another object of the present invention is to provide data processing apparatus and method which can effectively utilize a memory.

An another object of the present invention is to provide data processing apparatus and method which can manage data stored in a memory such that the data becomes missing.

An another object of the present invention is to provide data processing apparatus and method which can urge to output data stored in a memory.

The above and other objects of the present invention will become apparent from the following detailed description when read in conjunction with the accompanying drawings.

DETAILED DESCRIPTION OF THE PREFERRED EMBODIMENTS

Figure 1:
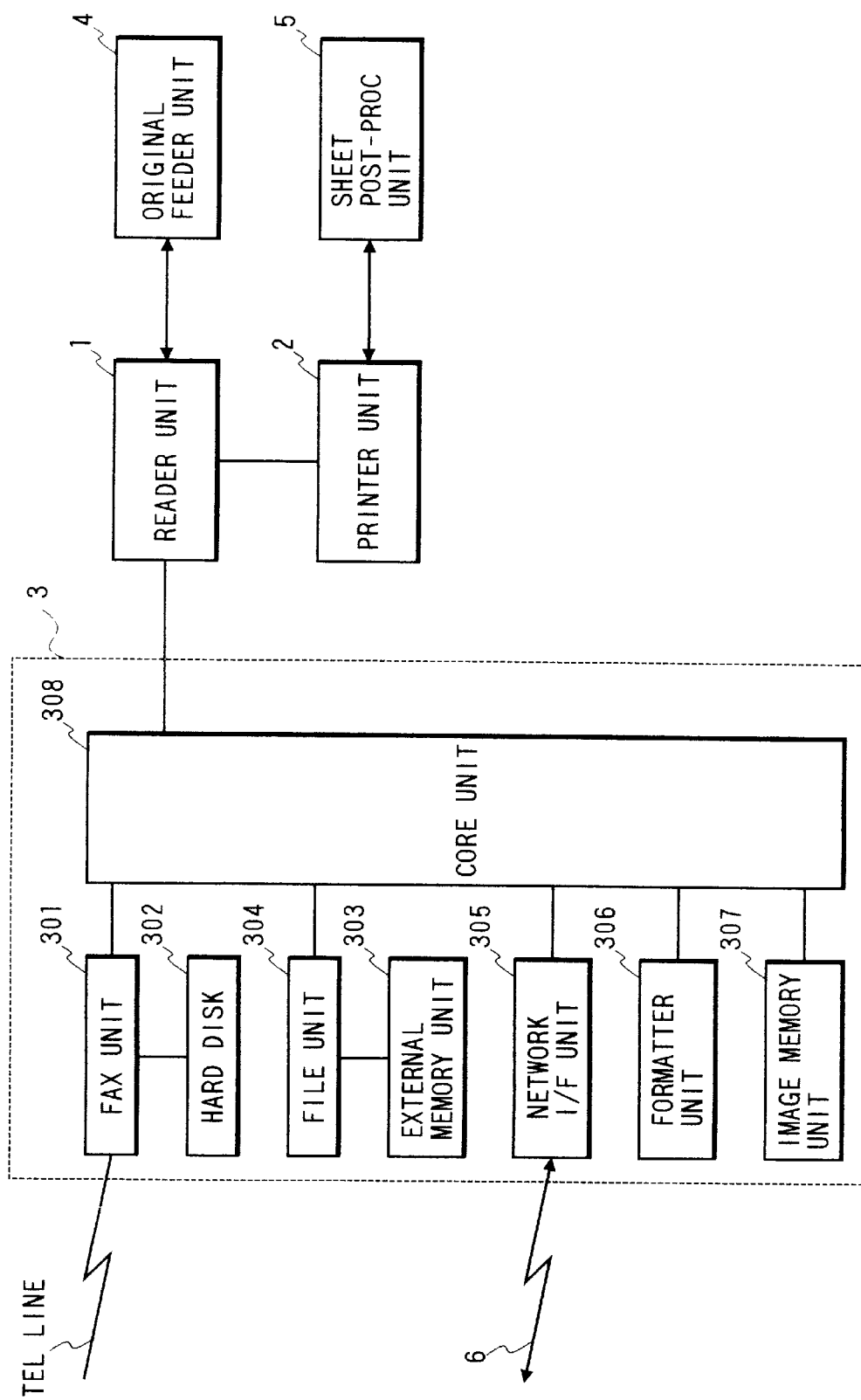
FIG. 1 is a block diagram showing schematic structure of an image formation apparatus according to an embodiment of the present invention.
Figure 2:
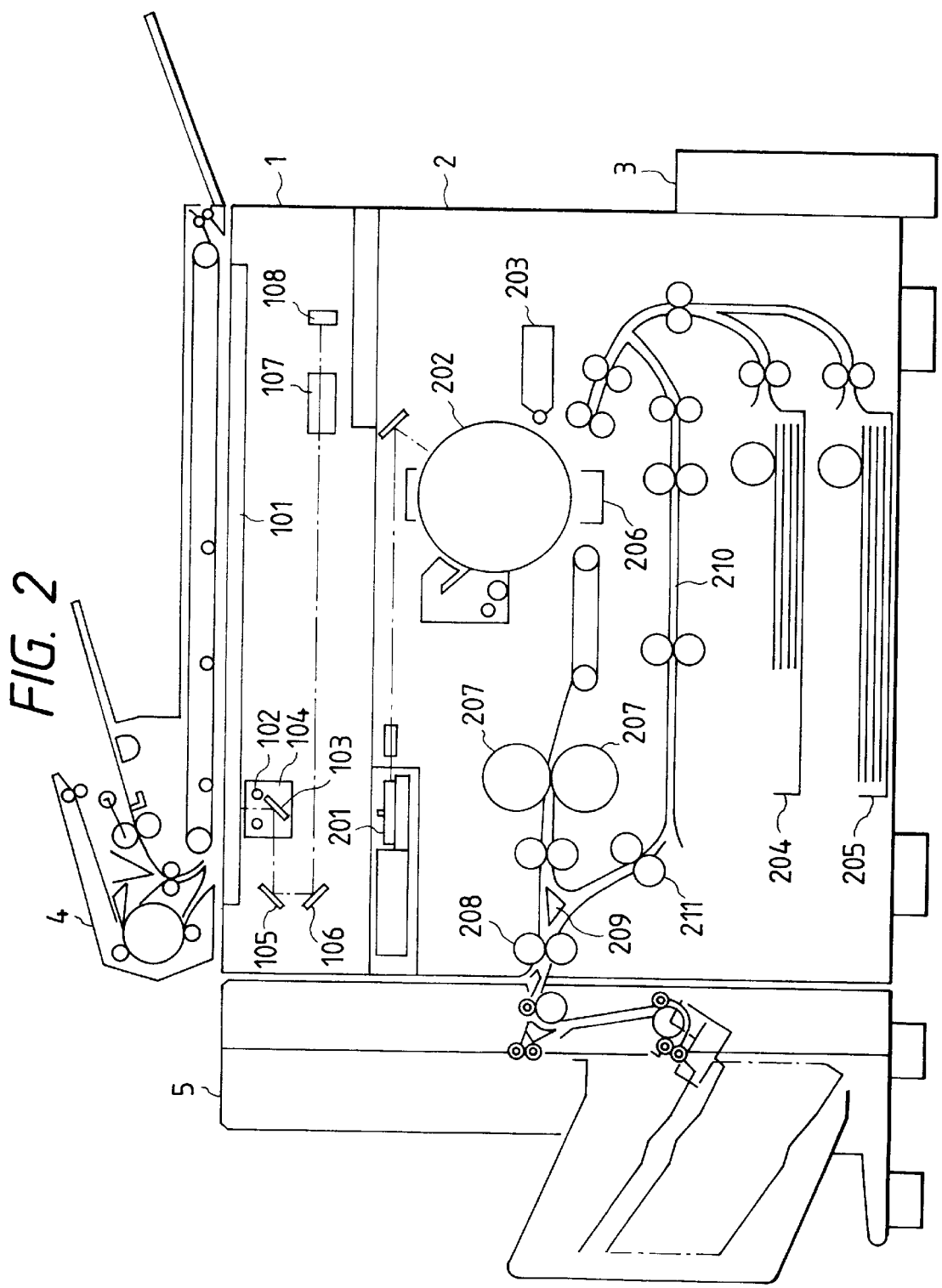
FIG. 2 is a side-sectional view showing structure of the image formation apparatus.

Hereinafter, an image formation apparatus according to an embodiment of the present invention will be explained in detail with reference to the accompanying drawings. FIG. 1 is a block diagram showing the schematic structure of the image formation apparatus, and FIG. 2 is a side-sectional view showing the concrete structure of the image formation apparatus.

The image formation apparatus according to the present embodiment has, as main parts, an image input unit (i.e., a reader unit) 1, an image output unit (i.e., a printer unit) 2, an image input/output control unit 3, a circulating-type automatic original feed unit (i.e., an original feed unit) 4 and a sheet (or paper) post-process unit 5. A main body of the image formation apparatus is composed of the reader unit 1 and the printer unit 2.

Initially, the structure of the reader unit 1 and the structure of the printer unit 2 will be explained. The reader unit 1, which converts an image on an original into digital image data, has an original mounting board (i.e., a platen glass plane) 101, a scanner unit 104 including a lamp 102 and a mirror 103, mirrors 105 and 106, a lens 107, and an image sensor unit (CCD) 108 including photoelectric conversion elements.

The printer unit 2 is an image formation means which outputs the image data onto a sheet or a paper as a visible image in response to print order. The printer unit 2 has an exposure control unit 201, a photosensitive body 202, a development unit 203, a plurality kinds of recording sheet (or paper) cassettes 204 and 205, a transfer unit 206, a fixing unit 207, a sheet (or paper) discharge unit 208, a feeding direction switch member 209, a re-supply sheet (or paper) mounting unit 210 and a feed roller 211.

Then, operations of the reader unit 1 and the printer unit 2 will be explained hereinafter. In the reader unit 1, the plurality of sheets, i.e., the original, mounted on the circulating-type automatic original feed unit 4 are sequentially fed onto the platen glass plane 101 one by one. The structure and operation of the circulating-type automatic original feed unit 4 will be explained later. When the original is fed at a predetermined position on the platen glass plane 101, the lamp 102 in the scanner unit 104 is turned on, and the scanner unit 104 moves to irradiate the original. A reflected light supplied from the original is input into the image sensor unit (CCD) 108 via the mirrors 103, 105 and 106, and the lens 107. Then, the reflected light supplied from the original and input into the CCD 108 is subjected to an electrical process such as photoelectric conversion or the like and then subjected to an ordinary digital process. After then, an obtained digital-processed signal is input into the printer unit 2.

In the printer unit 2, the image signal input into the printer unit 2 is modulated and converted into an optical signal by the exposure control unit 201, and then irradiated onto the photosensitive body 202. A latent image which is formed on the photosensitive body 202 by irradiated lights is developed by the development unit 203. The sheet is fed from the recording sheet cassette 204 or 205 such that a leading edge thereof is in alignment with an edge of the development unit 203, and then the developed image is transferred onto the sheet by the transfer unit 206. The transferred image is fixed to the sheet by the fixing unit 207 and then discharged or output from the sheet discharge unit 208. The sheets which were output from the sheet discharge unit 208 are sorted and/or stapled by the sheet post-process unit 5, in accordance with a previously-designated operation mode. The structure and operation of the sheet post-process unit 5 will be explained later.

In a case where the images which are sequentially read are output onto both sides or surfaces of the single sheet, the sheet which was fixed by the fixing unit 207 is once fed to the sheet discharge unit 208. Then, a feeding direction of the sheet is inverted and the sheet is again fed to the re-supply sheet mounting unit 210 via the feeding direction switch member. Thereafter, when the next original is prepared, the original image thereof is read in the same manner as that in an above process. In this case, the sheet to which the image is transferred is fed from the resupply sheet mounting unit 210, whereby the original images corresponding to two pages can be output respectively onto the front and rear surface of the same sheet.

Subsequently, the structure of the image input/output control unit 3 will be explained hereinafter. The image input/output control unit 3 has various kinds of functions and is electrically connected to the reader unit 1 via a cable. The image input/output control unit 3 has a facsimile unit 301 for performing facsimile transmission and reception via a telephone line, a hard disk 302 connected to the facsimile unit 301, a file unit 304 for converting various kinds of original information into electrical signals and storing them into an external memory unit 303 such as an optimagnetic disk or the like, a network interface unit 305 connected to a network such as a LAN, a formatter unit 306 for generating the visible image from the image information by developing cord information such as PDL (page description language) or the like from a computer on the LAN into the image information, an image memory unit 307 for storing the image information read by the reader unit 1 and temporarily storing the information sent from the computer on the LAN, a core unit 308 for controlling the various kinds of functions, and the like. In FIG. 1, reference numeral 6 denotes the LAN to which peripheral equipments such as a personal computer (PC), a work station (WS) and the like are connected. The LAN 6 is further connected to the network interface unit 305.

Subsequently, the operation of the image input/output control unit 3 will be explained hereinafter. The image signal which was input from the image input/output control unit 3 into the printer unit 2 via the reader unit 1 is fixed as the visible image to the sheet by the fixing unit 207. Then, the sheet on which the visible image was formed is fed in a direction of the re-supply sheet mounting unit 210 via the feeding direction switch member 209. In this case, when the sheet passes the feeding direction switch member 209, the feeding direction switch member 209 is switched and simultaneously the feed rollers 211 are inversely rotated, whereby the sheet is discharged or ejected from the image output unit 2 via the sheet discharge unit 208.

Figure 3:
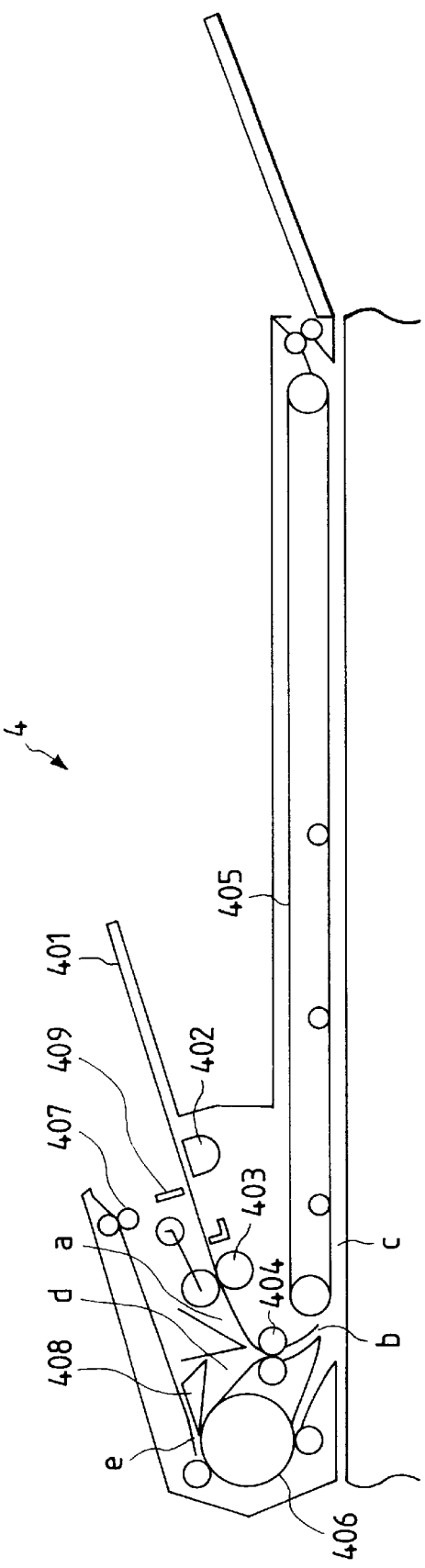
FIG. 3 is a side-sectional view showing structure of a circulating-type automatic original feed unit 4.

Then, the structure of the circulating-type automatic original feed unit 4 will be explained hereinafter. FIG. 3 is a side-sectional view showing the structure of the circulating-type automatic original feed unit 4. This feed unit 4 has an original mounting tray 401 on which a bundle of originals is mounted or placed. The original mounting tray 401 further has a feed unit which structures one part of an original feed unit.

The feed unit has a half-moon roller 402, separation feed rollers 403, a separation motor SPRMTR (not shown), resist rollers 404, a full-surface belt 405, a belt motor BELTMTR (not shown), a large feed roller 406, a feed motor FEEDMTR (not shown), discharge motors 407, a flapper 408, a recycle lever 409, a sheet (or paper) feed sensor ENTS (not shown), an inversion (or turning) sensor TRNS (not shown), a sheet discharge (or ejection) sensor EJTS (not shown) and the like.

Subsequently, the operation of the circulating-type automatic original feed unit 4 will be explained hereinafter. The half-moon roller 402 and the separation feed rollers 403 which are rotated by the separation motor SPRMTR are structured or separate the original one by one from a lowermost portion of the original bundle mounted on the original mounting tray 401. The resist rollers 404 and the full-surface belt 405 feed the original which was rotated and separated from the bundle by the belt motor BELTMTR up to an exposure position (in an original path c) on the platen glass plane 101, via original paths a and b. The large feed roller 406 which is rotated by the feed motor FEEDMTR feeds the original on the platen glass plane 101 from the original path c into an original path e. The original which was fed into the original path e is returned up to an uppermost portion of the original bundle on the original mounting tray 401 by the sheet discharge rollers 407.

The recycle lever 409 detects one cyclical feeding of the originals. That is, the recycle lever 409 is placed on the original bundle when the original feeding starts, and then the originals are sequentially fed. Subsequently, when a trailing edge of the final original passed the recycle lever 409, the recycle lever falls due to its weight, thereby detecting one cyclical feeding of the originals. In case of feeding two-face (i.e., both-face) originals, the original is once fed from the original paths a and b into the original path c by the original feed unit, and then the large feed roller 406 is rotated and the flapper 408 is switched, whereby the leading edge of the original is introduced into an original path d. Subsequently, the original is passed via the original path b by the resist rollers 404, and fed and stopped on the platen glass plane 101 by the full-surface belt 406, thereby inverting or turning the original. That is, the original is inverted in a path consisting of the original paths c→d→b. Moreover, the original of the original bundle is fed one by one in a path consisting of the original paths a→b→c→e until one cyclical feeding of the originals is detected by the recycle lever 409, whereby the number of originals can be counted.

Figure 4:
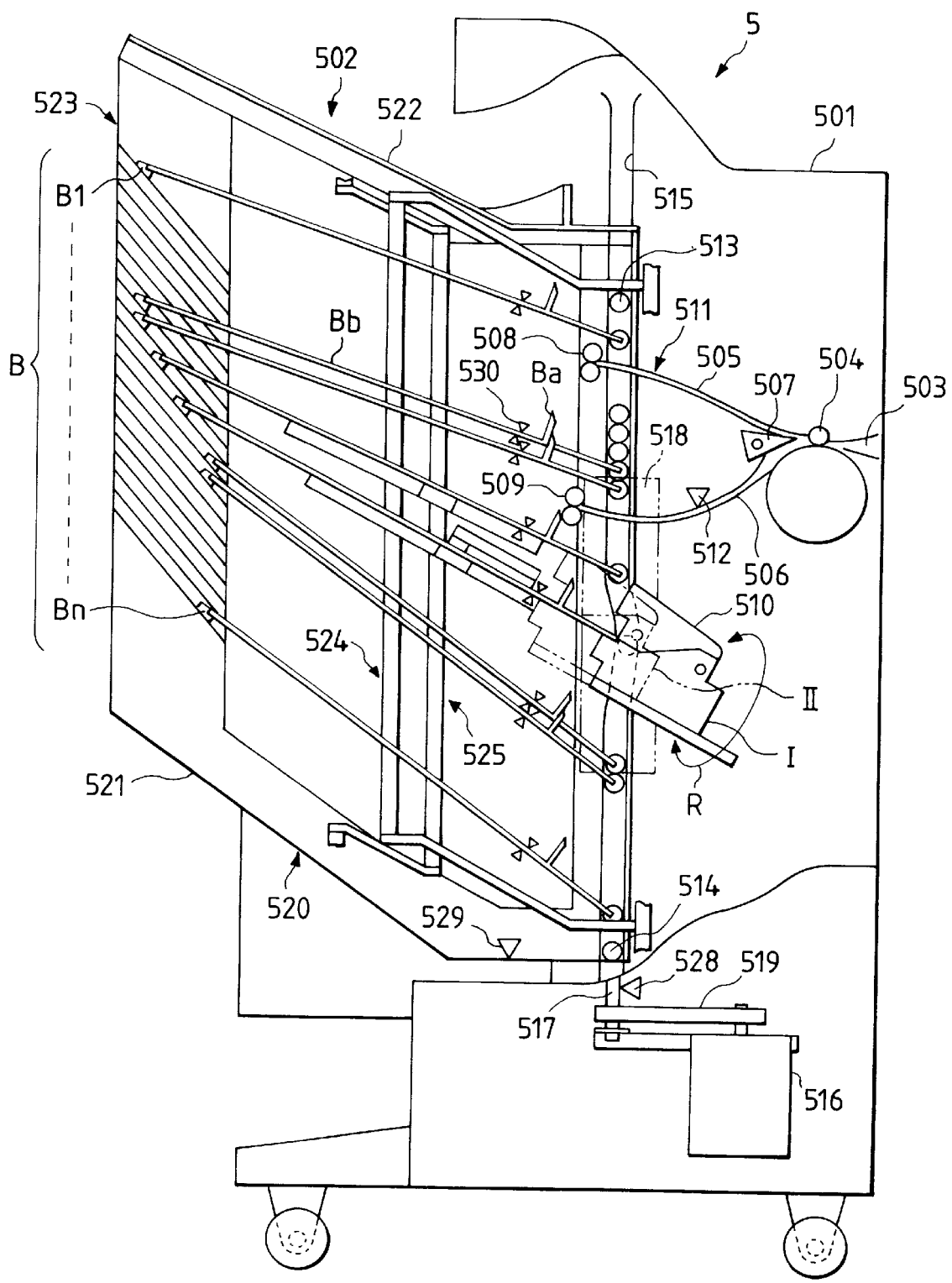
FIG. 4 is a sectional view showing structure of a sheet (or paper) post-process unit.
Figure 5:
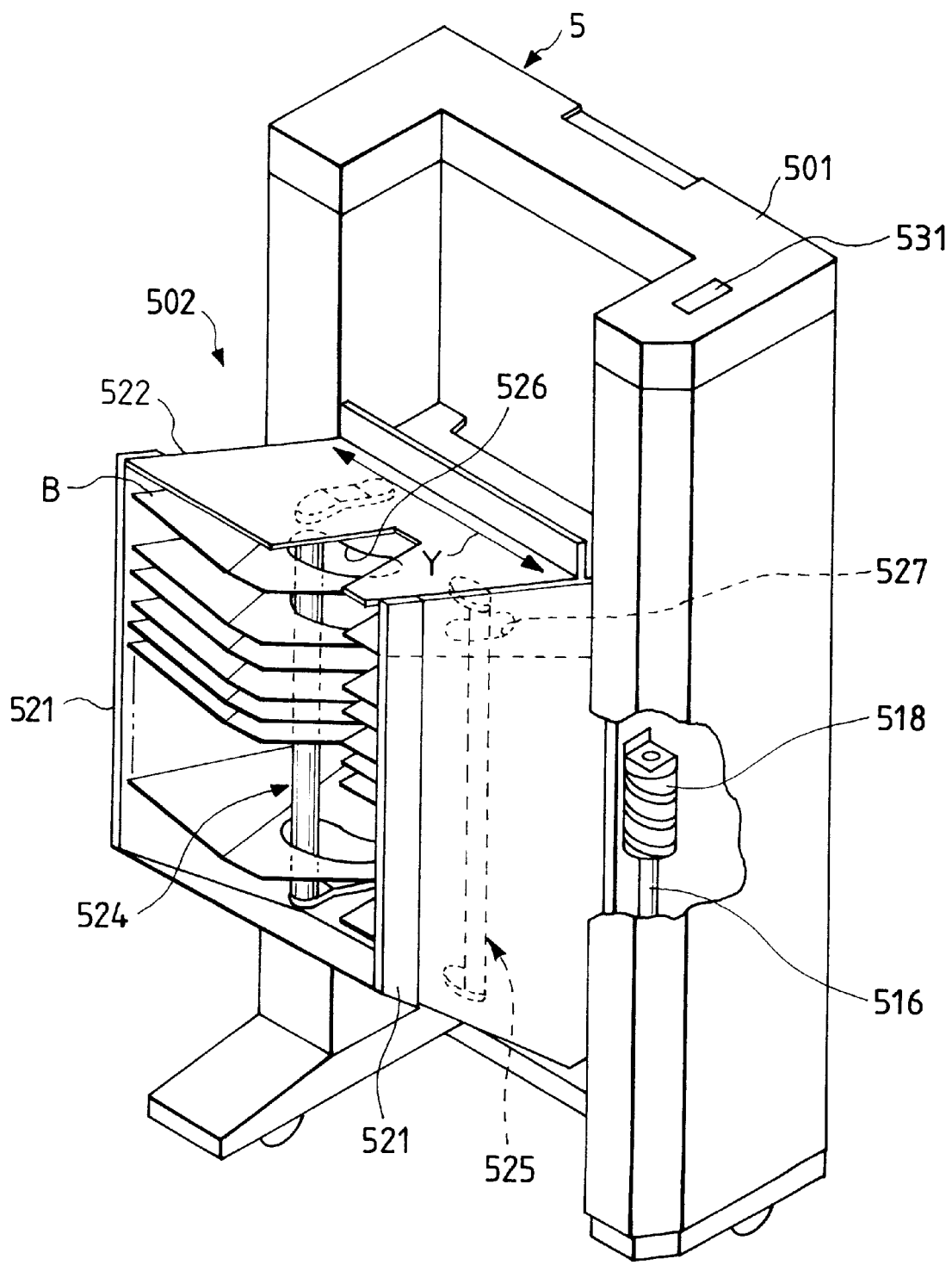
FIG. 5 is a perspective view showing an outward appearance of the sheet post-process unit.

The structure of the sheet (or paper) post-process unit 5 will be explained hereinafter. FIG. 4 is a sectional view showing the structure of the sheet post-process unit 5, and FIG. 5 is a perspective view showing an outward appearance of the unit 5.

The sheet post-process unit 5 is composed of a unit main body 501, a bin unit (i.e., a sheet discharge unit) 502 and a stapler (i.e., a stapling unit) 510. The main body 501 has a pair of insertion rollers 504 adjacent to an insertion opening 503. On a downstream side of the pair of insertion rollers 504, a flapper 507 is provided to switch the sheet feeding direction into a feed path 505 or into a feed path 506. One feed path 505 expands substantially in a horizontal direction, and a pair of feed rollers 508 is provided on a downstream side of the path 505. The other feed path 506 expands substantially in a downward direction, and a pair of feed rollers 509 is provided on a downstream side of the path 506.

The stapler 510 is provided at a position adjacent to the pair of feed rollers 509. These feed rollers 504, 508 and 509 are driven by a feed motor (not shown). A non-sort path sensor 511 is provided in the feed path 505 to detect passing of the sheet, and a sort path sensor 512 is provided in the feed path 506.

The bin unit 502 which has a number of bins B is provided on a downstream side the feed rollers 508 and 509. There is provided a spring one end of which is engaged with a hook of the bin unit 502 and the other end of which is fixed to the unit main body 501, to hold weight of the bin unit 502. As a result, the bin unit 502 is supported to be able to move or shift upwardly and downwardly. In the bin unit 502, guide rollers 513 and 514 are provided respectively at upper and lower portions on a base edge side. Therefore, the guide rollers 513 and 514 are rolled within a guide groove 515 expanding in both upward and downward directions, so as to guide the bin unit 502 upwardly and downwardly.

Further, a shift motor 516 is provided in the unit main body 501, and a lead cam 518 is fixed to a rotational axis 517 which is axially supported by the unit main body 501. A tensional chain 519 is wounded about an output axis of the shift motor 516, whereby rotation of the shift motor 516 is transmitted to the rotational axis 517 via the chain 519.

Furthermore, the bin unit 502 has a unit main body 523 which is composed of a bottom frame 520 including an inclination portion and a vertical portion, a pair of frames 521 vertically provided on edge front and rear sides (in the drawing) of the bottom frame 520, and a cover 522 supported by the pair of frames 521.

On the front side (in the drawing) of the bin unit main body 523, a reference plate is provided to touch the sheets such that the sheets can be aligned. On a rear side (in the drawing) of the bottom frame 520, a first lower arm is supported to be rotatable by a first alignment motor (not shown). Further, at a position on the cover 522 which position is opposite to the first lower arm, a first upper arm is rotatively supported via an axis which is identical with a support axis of the first lower arm. A first alignment rod 524 which is installed between edges of the first upper and lower arms is rotated by the first alignment motor to align the sheets S on the bin B on the front side of the bin unit.

Similarly, on a front side (in the drawing) of the bottom frame 520, a second lower arm is supported to be rotatable by a second alignment motor (not shown). Further, at a position on the cover 522 which position is opposite to the second lower arm, a second upper arm is rotatively supported via an axis which is identical with a support axis of the second lower arm. A second alignment rod 525 which is installed between edges of the second upper and lower arms is rotated by the second alignment motor to align the sheets S on the bin B on the rear side of the bin unit.

The first and second alignment motors are stepping motors, respectively. Positions of the first and second alignment rods 524 and 525 are detected by an alignment rod home sensor, whereby the positions of the rods 524 and 525 can be accurately controlled in accordance with the number of pulses supplied to the stepping motors.

Engaging plates are provided respectively on edge front and rear (in the drawing) portions of the bin B. The engaging plates engage with support plates provided inside the frame 521, whereby an edge side of the bin B can be supported. Further, the bin B has long holes 526 and 527. The long hole 526 is provided at a position which is apart from the support axis of the first upper and lower arms by a predetermined distance. A length of the hole 526 is longer than a rotational distance of the first alignment rod 524, and a width of the hole 526 is enough wider than a width of the first alignment rod 524. Further, the long hole 527 is provided at a position which is apart from the support axis of the second upper and lower arms by a predetermined distance. A length of the hole 527 is longer than a rotational distance of the second alignment rod 525, and a width of the hole 527 is enough wider than a width of the second alignment rod 525.

A base edge portion Ba of the bin B is upwardly provided perpendicularly to a sheet (or paper) holding plane Bb. The bin B is inclined in respect of the unit main body 501 at a predetermined angle such that an edge thereof is upward. Therefore, the sheet is slid downwardly on the sheet holding plane Bb by such inclination, and the trailing edge of the sheet bumps against the base edge portion Ba, whereby the leading and trailing edges of the sheets are aligned.

Further, on the bin B, a notch is provided at a position into which the stapler 510 is introduced, such that the bin B does not interfere with the stapler 510. The first alignment rod 524 is being inserted in the long hole 526 of bins B1, B2, . . . Bn, and the first alignment rod 524 is rotated within the long hole 526 such that the sheets on the bin B are aligned on the front (in the drawing) side. Similarly, the second alignment rod 525 is being inserted in the long hole 527 of the bins B1, B2, . . . Bn, and the second alignment rod 525 is rotated within the long hole 527 such that the sheets on the bin B are aligned on the rear (in the drawing) side.

The lead cam 518 is engaged with a part of the bin B such that the bin unit 502 moves up and down along the guide groove 515 by rotation of the lead cam 518. One rotation of the lead cam 518 is detected by a lead cam sensor 528 which is provided adjacently to a lead cam 529. A sort tray sheet (or paper) presence/absence sensor 530 can detect whether the sheet or paper is present on the bin B.

The electrical stapler 510 which performs a stapling process for the sheets held in the bin B is provided adjacently to the pair of feed rollers (i.e., lower discharge rollers) 510. Further, the stapler 510 is provided at a position perpendicular to a sheet inserting direction such that the stapler 510 can be forwarded or returned by a driving unit. In an ordinary state, the stapler 510 is being sheltered at a first position (I) not to interfere the up and down movements of the bin B. In a case where the sheet bundle on the bin B is stapled, the stapler 510 is forwarded up to a second position (II) by the driving unit to perform the stapling process for the sheet bundle. After the stapling process terminated, the electrical stapler 510 is returned to the first position (I) by the driving unit.

Further, the electrical stapler 510 performs the stapling by rotation of a motor (not shown). In case of stapling the sheets on the plurality of bins B, the bin unit 502 is moved to a predetermined bin position after the stapling of the sheet on the bin B terminated, the stapler 510 staples the sheet on the another bin B. The driving unit can rotate the stapler 510 in a direction indicated by an arrow R, and move (i.e., slide) the stapler 510 in a direction indicated by an arrow Y.

However, in a case where the sheet was turned to be discharged, the stapler 510 is turned or upset by the driving unit. Further, in a case where an output image is rotated by an image rotation circuit 145 (described later), the stapler 510 is slid in the direction indicated by the arrow Y (FIG. 5) by the driving unit, in accordance with a detected result of a stapler position detection unit (not shown). After then, the stapler 510 performs the stapling in such a manner same as above. In FIG. 5, reference numeral 531 denotes a manual stapling key. In case of depressing the manual stapling key 531 after sorting terminated, the stapler 510 performs the stapling. Further, the sheet bundle on the bin can be pushed on and forwarded to the front (in the drawing) side by the rotation of the first alignment rod 524.

Figure 6:
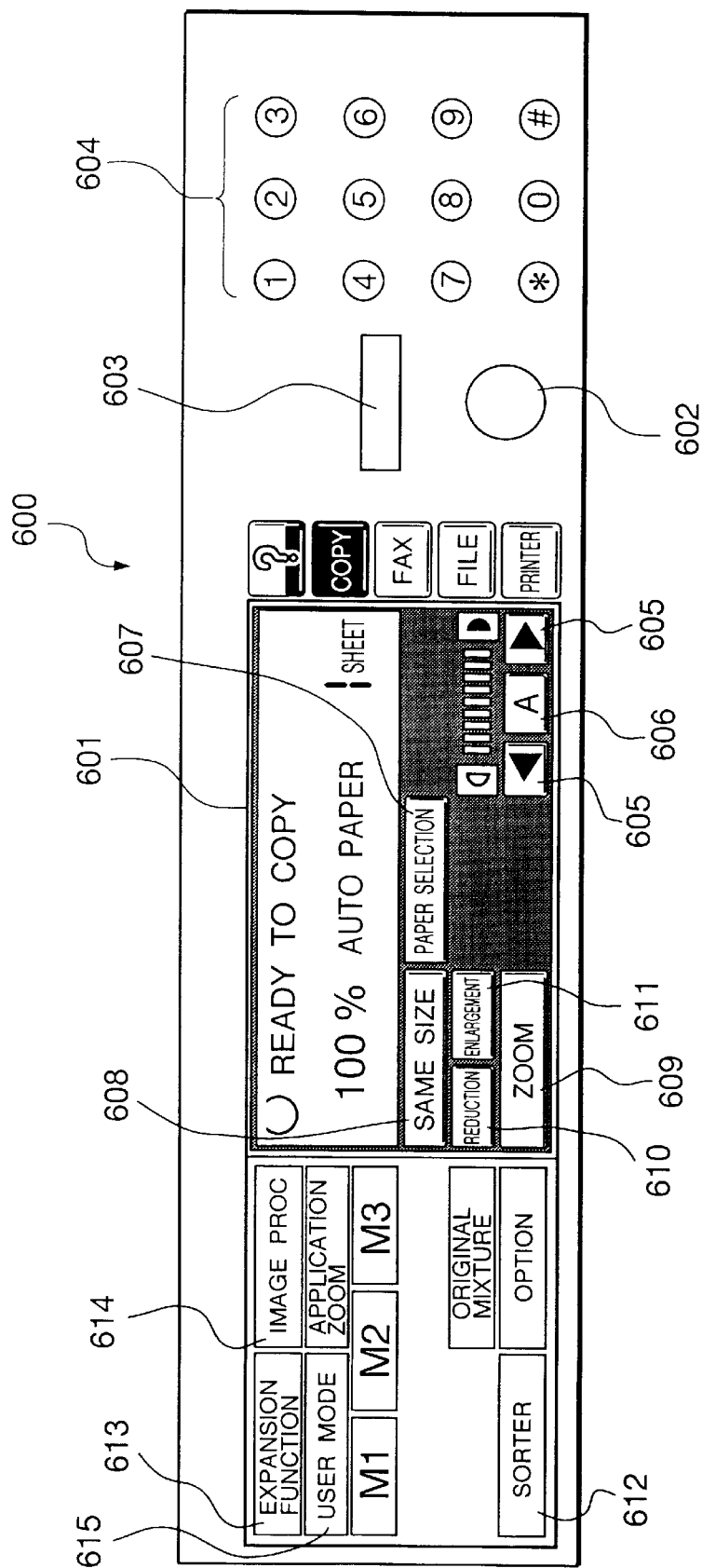
FIG. 6 is a plane view showing a console and display panel 600 which is provided on a main body composed of a reader unit 1 and a printer unit 2.

The structure of a console and display showing a touch-explained hereinafter. FIG. 6 is a plane view showing a touch-panel type console and display panel 600 which is provided on the main body composed of the reader unit 1 and the printer unit 2. On a console plane of the console and display panel 600, there is provided a display unit 601 which is composed of various keys, a liquid crystal display and the like (later described). The display unit 601 displays information as to states of the apparatus, the number of copies (i.e., the number of sheets or copies to be copied), a magnification, sheet (or paper) selection and various operations.

On the console and display panel 600, reference numeral 602 denotes a copy start key which is depressed in case of starting the copy. Reference numeral 603 denotes a clear/stop key which has a clear key function for releasing a setting mode when it is depressed during standby, and has a stop key function for stopping or interrupting the operation when it is depressed during image recording. The clear/stop key 603 is depressed in case of releasing the setting number of copies. Reference numeral 604 denotes a ten key which is depressed in case of setting the number of copies. Reference numerals 605 denote copy density keys which are depressed in case of manually adjusting a copy density. Reference numeral 606 denotes an automatic density adjustment key (i.e., AE key) which is depressed in case of automatically adjusting the copy density in accordance with an original density or in case of releasing an automatic density adjustment (AE) mode and switching the mode into a manual density adjustment mode.

Reference numeral 607 denotes a cassette selection key which is depressed in case of selecting the plurality kinds of sheet cassettes 204 and 205 (shown in FIG. 2) and the like. Further, in a case where the original is being mounted or placed on the original feed unit 4, an automatic sheet (or paper) selection (APS) mode can be selected by the cassette selection key 607. When the APS mode is selected, the cassette in which the sheet of which size is the same as that of the original is automatically selected.

Reference numeral 608 denotes a same-size (original-size) key which is depressed in case of obtaining the copy of which size is the same as that of the original image. Reference numeral 609 denotes a zoom key which is depressed in case of designating a desired magnification within a range of 64% to 142%. Reference numerals 610 and 611 denotes predetermined magnification zoom keys which are depressed in case of designating predetermined-magnification reduction and enlargement.

Reference numeral 612 denotes keys which select operation modes of the sheet post-process unit 5. The keys 612 can select and release a sheet discharge mode (i.e., staple mode). That is, in a case where the stapler 510 capable of stapling the sheets after image recording is being connected, the keys 612 can select or release the staple mode or the sort mode, and further can select or release a folding mode (i.e., sectional Z-shape mode or sectional V-shape mode) of the sheet on which the image recording has terminated. Reference numerals 613, 614 and 615 denote keys which set various processes, e.g., a two-face mode process, a binder margin setting process, a photograph mode process, multi-processes, a page serial copy process, a 2-in-1 mode process and the like.

Figure 7:
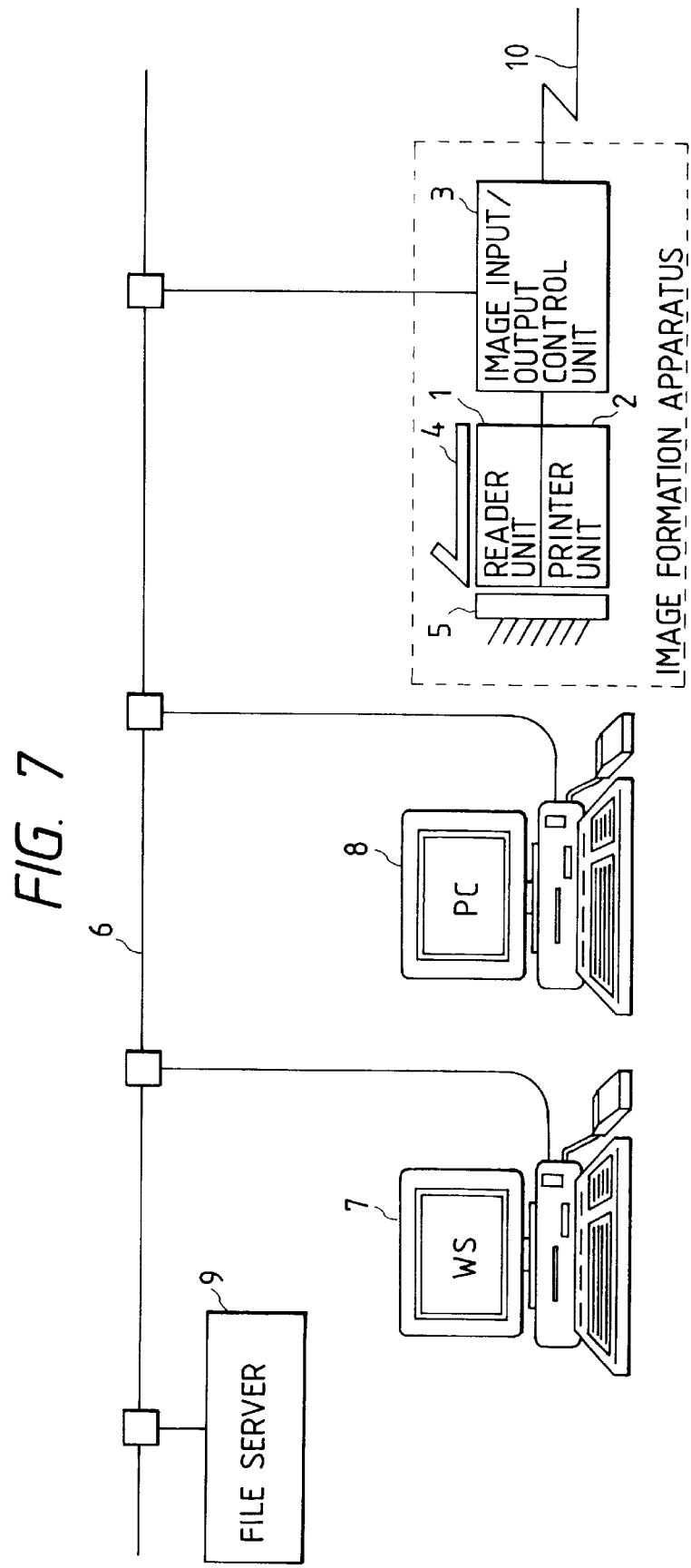
FIG. 7 is a view for explaining structure of a network.

The structure and operation of the local area network (LAN) 6 will be explained hereinafter. FIG. 7 is a view for explaining the structure of the network. The image formation apparatus which is composed mainly of the reader unit 1, the printer unit 2, the image input/output control unit 3, the circulating-type automatic original feed unit 4 and the sheet post-process unit 5 is connected to the LAN 6 via the image input/output control unit 3.

The LAN 6 is the network which is connected with a plurality of information equipments and can exchange data between the desired equipments. A work station (WS) 7 and a personal computer (PC) 8 which form, correct and display various documents are connected to the LAN 6 for externally exchanging the data. A file server 9 is a large-capacity memory unit which can be accessed from the image input/output control unit 3, the WS 8, the PC 9 and the like via the LAN 6.

A telephone line 10 which is connected to the image input/output control unit 3 is used for data transmission and reception to and from an other facsimile apparatus. Further, the reader 1, the printer 2 or the desired equipment connected to the LAN 6 is used for accessing a distant equipment or network.

Figure 8:
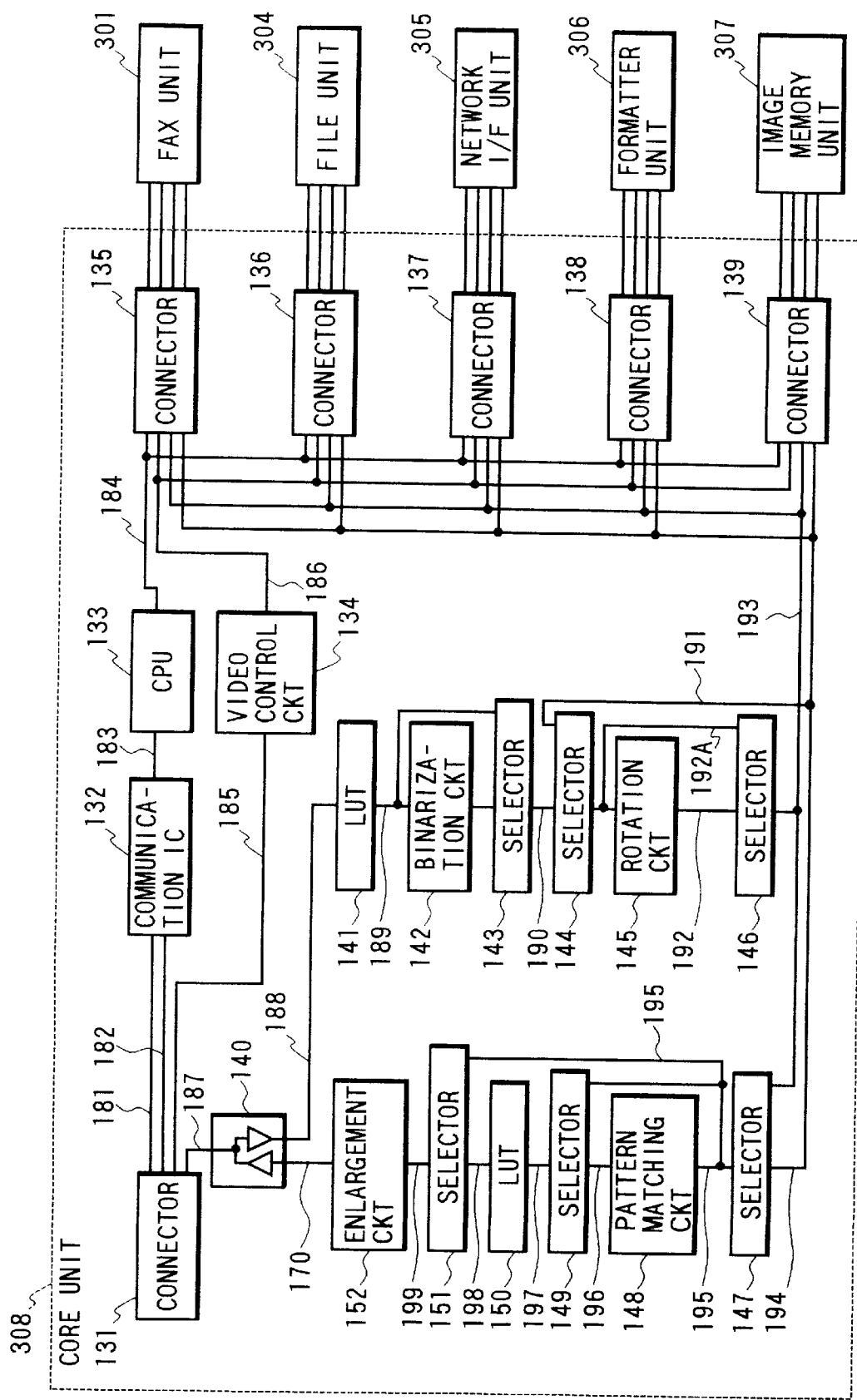
FIG. 8 is a block diagram showing structure of a core unit 308 of an image input/output control unit 3.

The core unit 308 will be explained hereinafter. FIG. 8 is a block diagram showing the structure of the core unit 308 which is provided in the image input/output control unit 3.

In the core unit 308, a connector 131 which is connected to a connector in the reader unit 1 via a cable is further connected to four kinds of signal lines. That is, an eight-bit multivalue video signal for one pixel flows in a first signal line 187, a control signal for controlling the video signal flows in a second signal line 185, a signal for communicating with a central processing unit (CPU) in the reader unit 1 flows in a third signal line 181, and a signal for communicating with a sub CPU in the reader unit 1 flows in a fourth signal line 182. After the signals flowing in the signal lines 181 and 182 are subjected to a communication protocol process by a communication IC 132, these signals transmit communication information to a CPU 133 via a CPU bus 183. Also, the CPU 133 measures various kinds of times.

The signal line 187 is a bi-directional video signal line. Therefore, via the signal line 187, the information supplied from the reader unit 1 can be received by the core unit 308, while the information supplied from the core unit 308 can be output to the reader unit 1. The signal line 187 is connected to a buffer 140, whereby such a bi-directional signal is divided or separated into two mono-directional signals respectively via signal lines 188 and 170. The eight bit multivalue video signal for one pixel which was supplied from the reader unit 1 flows in the signal line 188 to be input into a next-stage look-up table (LUT) 141.

The LUT 141 converts the image information supplied from the reader unit 1 into a desired value by comparing such the image information with data stored in the LUT 141. An output signal from the LUT 141 is input into a binarization circuit 142 and a selector 143 via a signal line 189. The binarization circuit 142 has a simple binarization function for binarizing the multivalue signal output to the signal line 189 by using a fixed slice level, a binarization function for binarizing the multivalue signal by using a variable slice level in which the slice level varies from the value of a pixel on the periphery of a target (or remarkable) pixel, and a binarization function for binarizing the multivalue signal in an error dispersion (or diffusion) manner.

In a case where the binarized information has a value "0", such the information is converted into the multivalue signal having a value "OOH", while in a case where the binarized information has a value "1", such the information is converted into the multivalue signal having a value "FFH". Then, the converted multivalue signal is input into the next-stage selector 143. The selector 143 selects either the output signal from the LUT 141 or the output signal from the binarization circuit 142. An output signal from the selector 143 is input into a selector 144 via a signal line 190. The selector 144 selects a signal line 194 via which output video (or image) signals from the facsimile unit 301, the file unit 304, the network interface unit 305, the formatter unit 306 and the image memory unit 307 are input into the core unit 308 respectively via connectors 135, 136, 137, 138 and 139, and an output signal line 190 of the selector 143, in response to an instruction by the CPU 133.

An output signal from the selector 144 is input into the rotation circuit 145 or a selector 146 via a signal line 191. The rotation circuit 145 has a function for rotating the input image signal at angles of +90, −90 and +180 degrees. After the information output from the reader unit 1 was converted into a binary signal by the binarization circuit 142, the rotation circuit 145 stores the obtained binary signal as the information from the reader unit 1. Subsequently, in response to the instruction from the CPU 133, the rotation circuit 145 rotates and read the stored information.

The selector 146 selects either one of an output signal from the rotation circuit 145 via a signal line 192 and an output signal from the selector 144 via a signal line 192A, and outputs the selected signal to the connector 135 connecting the facsimile unit 301, the connector 136 connecting the file unit 304, the connector 137 connecting the network interface unit 305, the connector 138 connecting the formatter unit 306, the connector 139 connecting the image memory unit 307 and a selector 147, via a signal line 193.

The signal line 193 is a sync-type eight-bit monodirectional video bus which transfers the image information from the core unit 308 to the facsimile unit 301, the file unit 304, the network interface unit 305, the formatter unit 306 and the image memory unit 307.

Further, the signal line 194 is a sync-type eight-bit monodirectional video bus which transfers the image information to the facsimile unit 301, the file unit 304, the network interface unit 305, the formatter unit 306 and the image memory unit 307. A video control circuit 134 controls these sync-type buses, i.e., the signal lines 193 and 194. Concretely, these buses are controlled in response to an output signal from the video control circuit 134 via a signal line 186. In addition, the connectors 135 to 139 are connected with the signal line 184.

The signal line 184 is a bi-directional (two-way) 16-bit CPU bus, and a data command is exchanged in a non-sync system or manner via the signal line 184. The information can be transferred from the core unit 308 to the facsimile unit 301, the file unit 304, the network interface unit 305, the formatter unit 306 and the image memory unit 307, via the above-described two video buses 193 and 194 and the CPU bus 184.

The signals which are supplied from the facsimile unit 301, the file unit 304, the network interface unit 305, the formatter unit 306 and the image memory unit 307 are input into the selectors 144 and 147, respectively. The selector 144 inputs the signal from the signal line 194 into the next-stage rotation circuit 145, in response to the instruction from the CPU 133.

Further, the selector 147 selects the signals from the signal lines 193 and 194, in response to the instruction from the CPU 133. The output signal from the selector 147 via a signal line 195 is input into a pattern matching circuit 148 and a selector 149. The pattern matching circuit 148 performs pattern matching between a pattern of the input signal from the signal line 195 and a predetermined pattern. If the patters are matched with each other, the pattern matching circuit 148 outputs a predetermined multivalue signal to a signal line 196. On the other hand, if the patterns are not matched with each other, the pattern matching circuit 148 outputs the signal from the signal line 195 to the signal line 196.

The selector 149 selects the signals from the signal lines 195 and 196, in response to the instruction from the CPU 133. The output signal from the selector 149 via a signal line 197 is input into a next-stage LUT 150. In case of outputting the image information to the printer unit 2, the LUT 150 converts the input signal from the signal line 197 such that the input signal is matched with an output density of a printer. A selector 151 selects the output signal from the LUT 150 via a signal line 198 and the signal from the signal line 195, in response to the instruction from the CPU 133.

The output signal from the selector 151 is input into a next-stage enlargement circuit 152 via a signal line 199. The enlargement circuit 152 can set enlargement magnifications in X and Y directions independently, in response to the instruction from the CPU 133. In this case, the magnification is enlarged in a primary linear interpolation method. An output signal from the enlargement circuit 152 is input into the buffer 140. The signal which was input into the buffer 140 is output as the bi-directional signal in response to the instruction from the CPU 133. The output bi-directional signal from the buffer 140 is supplied to the printer unit 2 via the connector 131, and then the signal input into the printer unit 2 is printed on a recording sheet or paper as the visible image.

The operation of the core unit 308 will be explained hereinafter. In case of outputting the information to the facsimile unit 301, the CPU 133 performs the communication to a CPU of the reader unit 1 via the communication IC 132, to output an original scan instruction. In response to such the instruction, the scanner unit 104 scans the original whereby the reader unit 1 outputs the image information to the connector. The reader unit 1 and the image input/output control unit 3 are connected to each other by the cable, and thus the information from the reader unit 1 is input into the connector 131 in the core unit 308. Then, the image information input into the connector 131 is further input into the buffer 140 via the multivalue eight-bit signal line 187.

The buffer 140 inputs the bi-directional (two-way) signal from the signal line 187 into the LUT 141 as a monodirectional (one-way) signal via the signal line 188, in response to the instruction from the CPU 133. The LUT 141 converts the image information from the reader unit 1 into a desired value by using the data-in the table. For example, a background substrate of the original can be skipped over. The output signal from the LUT 141 is input into the next-stage binarization circuit 142. The binarization circuit 142 converts the eight-bit multivalue signal from the signal line 189 into the binarization signal. Further, if the binarized signal has the value "0", the binarization circuit 142 converts it into the multivalue signal having the value "OOH", while if the binarized signal has the value "1", the binarization circuit 142 converts it into the multivalue signal having the value "FFH". The output signal from the binarization circuit 142 is input into the rotation circuit 145 or the selector 146 via the selectors 143 and 144.

Also, the output signal from the rotation circuit 145 is input into the selector 146, and the selector 146 selects one of the signal from the signal line 191 and the signal from the signal line 192. To select the signal is determined in such a manner that the CPU 133 performs the communication with the facsimile unit 301 via the CPU bus 184. The output signal from the selector 146 is sent to the facsimile unit 301 via the connector 135.

Subsequently, it will be explained hereinafter a case where the information is received from the facsimile unit 301. The image information from the facsimile unit 301 is transferred to the signal line 194 via the connector 135. The signal from the signal line 194 is input into the selector 144 and the selector 147. In a case where the image at facsimile reception time is rotated and then output to the printer unit 2 in response to the instruction from the CPU 133, the signal input into the selector 144 is subjected to a rotational process by the rotation circuit 145. The output signal from the rotation circuit 145 is input into the pattern matching circuit 148 via the selectors 146 and 147.

On the other hand, in a case where the image at facsimile reception time is not rotated but is output to the printer unit 2 as it is in response to the instruction from the CPU 133, the signal input into the selector 147 via the signal line 194 is then input into the pattern matching circuit 148. The pattern matching circuit 148 has a function for smoothing unevenness in the image at facsimile reception time. The signal to which the pattern matching has been performed is input into the LUT 150 via the selector 149.

In order to output the facsimile-received image to the printer unit 2 with a desired density, the table in the LUT 150 is made variable by the CPU 133. The output signal from the LUT 150 is input into the enlargement circuit 152 via the selector 151. The enlargement circuit 152 performs the enlargement process on the eight-bit multivalue signal which is one of the two values ("OOH" and "FFH"), in the primary linear interpolation manner. The eight-bit multivalue signal output from the enlargement circuit 152 is transferred to the reader unit 1 via the buffer 140 and the connector 131.

The reader unit 1 inputs such the obtained signal into an external interface switch circuit via the connector. The external interface switch circuit inputs the signal from the facsimile unit 301 into a Y (yellow) signal generation and detection circuit. Then, an output signal from the Y signal generation and detection circuit is subjected to such the same process as described above, and then output to the printer unit 2, whereby the image is formed on an output sheet or paper.

Then, it will be explained hereinafter a case where the information is output to the file unit 304. The CPU 133 performs the communication with the CPU of the reader unit 1 via the communication IC 132 to output the original scan instruction. In response to the instruction, the scanner unit 104 in the reader unit 1 scans the original to output the image information to the connector. The reader unit 1 and the image input/output control unit 3 are connected with each other via the cable, and thus the information from the reader unit 1 is input into the connector 131 of the core unit 308. The image information which has been input into the connector 131 is then output as the mono-directional signal by the buffer 140. The signal which is the multivalue eight-bit signal and supplied from the signal line 188 is converted into a desired signal by the LUT 141. The output signal from the LUT 141 is input into the connector 136 via the selectors 143, 144 and 146.

That is, the eight-bit multivalue signal is transferred to the file unit 304 as it is, without using the functions of the binarization circuit 142 and the rotation circuit 145. In a case where the signal which was binarized by the communication with the file unit 304 via the CPU bus 184 of the CPU 133 is subjected to filling (i.e., storing into the external memory unit 303), the functions of the binarization circuit 142 and the rotation circuit 145 are used. The explanation of the binarization process and the rotational process are omitted in this case because these processes are the same as those in case of outputting the information to the facsimile unit 301.

Subsequently, it will be explained a case where the information is received from the file unit 304. The image information from the file unit 304 is input into the selector 144 or 147 via the connector 136 and the signal line 194. In case of performing the filing of the eight-bit multivalue signal, the image information from the file unit 304 can be input into the selector 147, while in case of performing the filing of the binary signal, the image information from the file unit 304 can be input into the selector 144 or 147. In case of performing the filing of the binary signal, the process is the same as that in case of receiving the information from the facsimile unit 301, whereby the detailed explanation thereof is omitted.

In case of performing the filing of the multivalue signal, the output signal from the selector 147 is input into the LUT 150 via the selector 149. Then, the LUT 150 forms the look-up table such that the density of the signal from the selector 147 is matched or coincided with the desired printing density of the printer unit 2, in response to the instruction from the CPU 133. The output signal from the LUT 150 is input into the enlargement circuit 152 via the selector 151. The eight-bit multivalue signal, which has been interpolated by the enlargement circuit 152 such that the image is enlarged with the desired magnification, is transferred to the reader unit 1 via the buffer 140 and the connector 131. The information of the file unit 304 which has been transferred to the reader unit 1 is output to the printer unit 2 in the same manner as that in case of the facsimile unit 301, whereby the image is formed on the output sheet or paper.

The network interface unit 305 includes a plurality of interfaces for performing communication with interfaces of an SCSI system, an RS232C system and a Centronics system, and the unit 305 connects the image input/output control unit 3 with the computer. Further, the network interface unit 305 includes the above-described three kinds of interfaces, and the information from each interface is transferred to the CPU 133 via the connector 137 and the data bus 184. Then, the CPU 133 performs various controlling on the basis of the contents of the transferred information.

The formatter unit 306 has a function for developing the command data such as a document file transmitted from the network interface unit 305, into the image data. If the CPU 133 judges that the data transferred from the network interface unit 305 via the data bus 184 is the data concerning the formatter unit 306, the CPU 133 transfers such the data to the formatter unit 306 via the connector 138. Then, the formatter unit 306 develops the transferred data into the memory, as a meaningful image such as a character, a figure and the like.

Subsequently, it will be explained hereinafter a procedure where the information from the formatter unit 306 is received to perform the image formation on the output sheet or paper. The image information from the formatter unit 306 is transferred to the signal line 194 via the connector 138, as the multivalue signal having either one of the two values ("OOH" and "FFH"). The signal from the signal line 194 is input into the selectors 144 and 147. The selectors 144 and 147 are controlled in response to the instruction from the CPU 133. The following processes are the same as those in case of receiving the information from the facsimile unit 301, whereby the explanation thereof is omitted.

It will be then explained a case where the information is output to the image memory unit 307. The CPU 133 performs the communication to the CPU of the reader unit 1 via the communication IC 132, to output the original scan instruction. In the reader unit 1, the scanner unit 104 scans the original in response to the instruction from the CPU 133 to output the image information to the connector. The reader unit 1 and the image input/output control unit 3 are connected to each other via the cable, whereby the information from the reader unit 1 is input into the connector 131 of the core unit 131. The image information which has been input into the connector 131 is transferred to the LUT 141 via the eight-bit multivalue signal line 187 and the buffer 140.

The output signal from the LUT 141 is transferred as the multivalue image information to the image memory unit 307 via the selectors 143, 144, 146 and the connector 139. The image information stored in the image memory unit 307 is transferred to the CPU 133 via the CPU bus 184 of the connector 139. Then, the CPU 133 transfers the data transferred from the image memory unit 307, to the network interface unit 305. The network interface unit 305 transfers the data to the computer by using the desired interface to be selected from among the three kinds of interfaces (i.e., SCSI, RS232C and Centronics interfaces).

Subsequently, it will be explained hereinafter a case where the information is received from the image memory unit 307. Initially, the image information is transferred from the computer to the core unit 308 via the network interface unit 305. If the CPU 133 of the core unit 308 judges that the data transferred from the network interface unit 305 via the CPU bus 184 is the data concerning the image memory unit 307, the CPU 133 transfers such the data to the image memory unit 307 via the connector 139. Then, the image memory unit 307 transfers the obtained data to the selector 144 or 147 via the connector 139 and the eight-bit multivalue signal line 194. In response to the instruction from the CPU 133, the output signal from the selector 144 or 147 is output to the printer unit 2 in the same manner as that in case of receiving the data from the facsimile unit 301, whereby the image is formed on the output sheet or paper.

Figure 9:
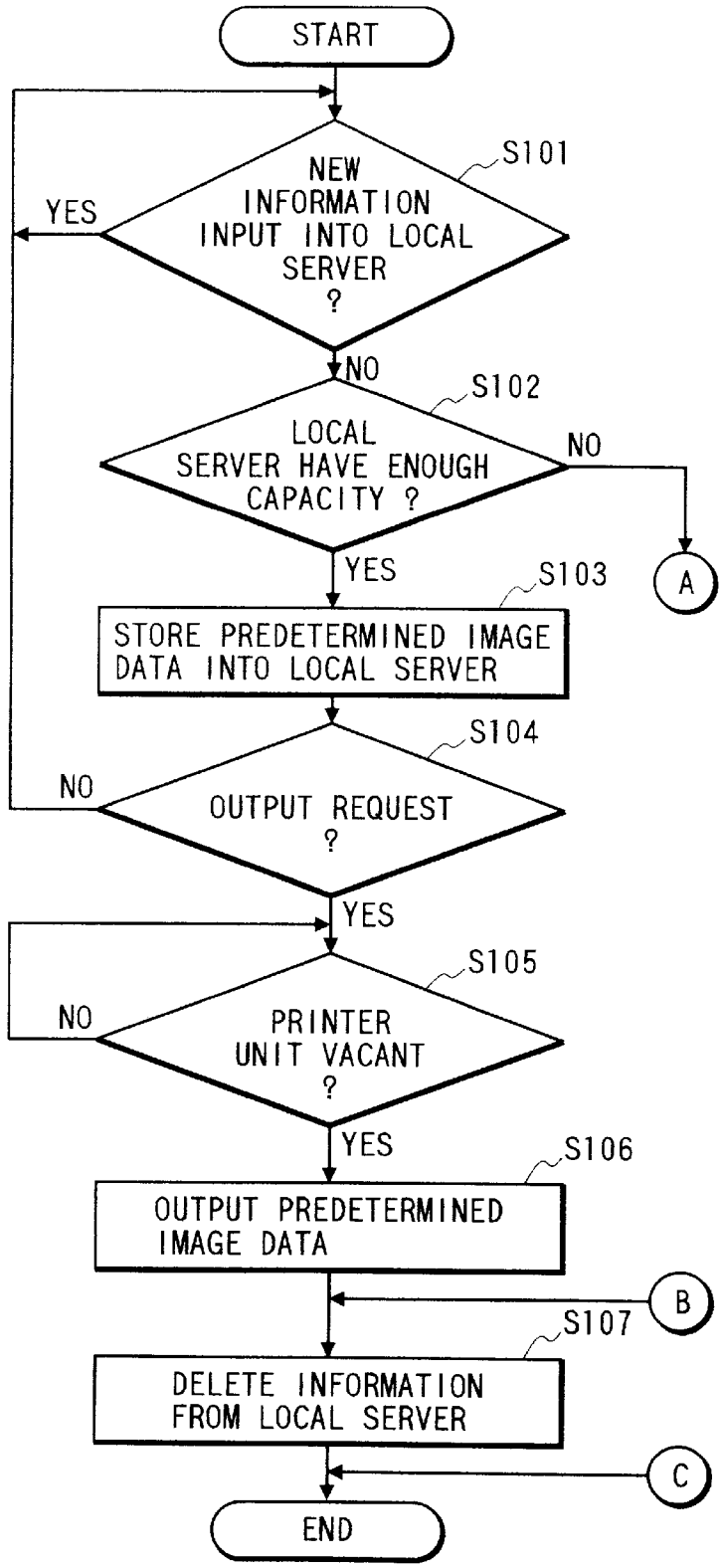
FIG. 9 is a flow chart showing procedure of an operation process of the image formation apparatus.
Figure 10:
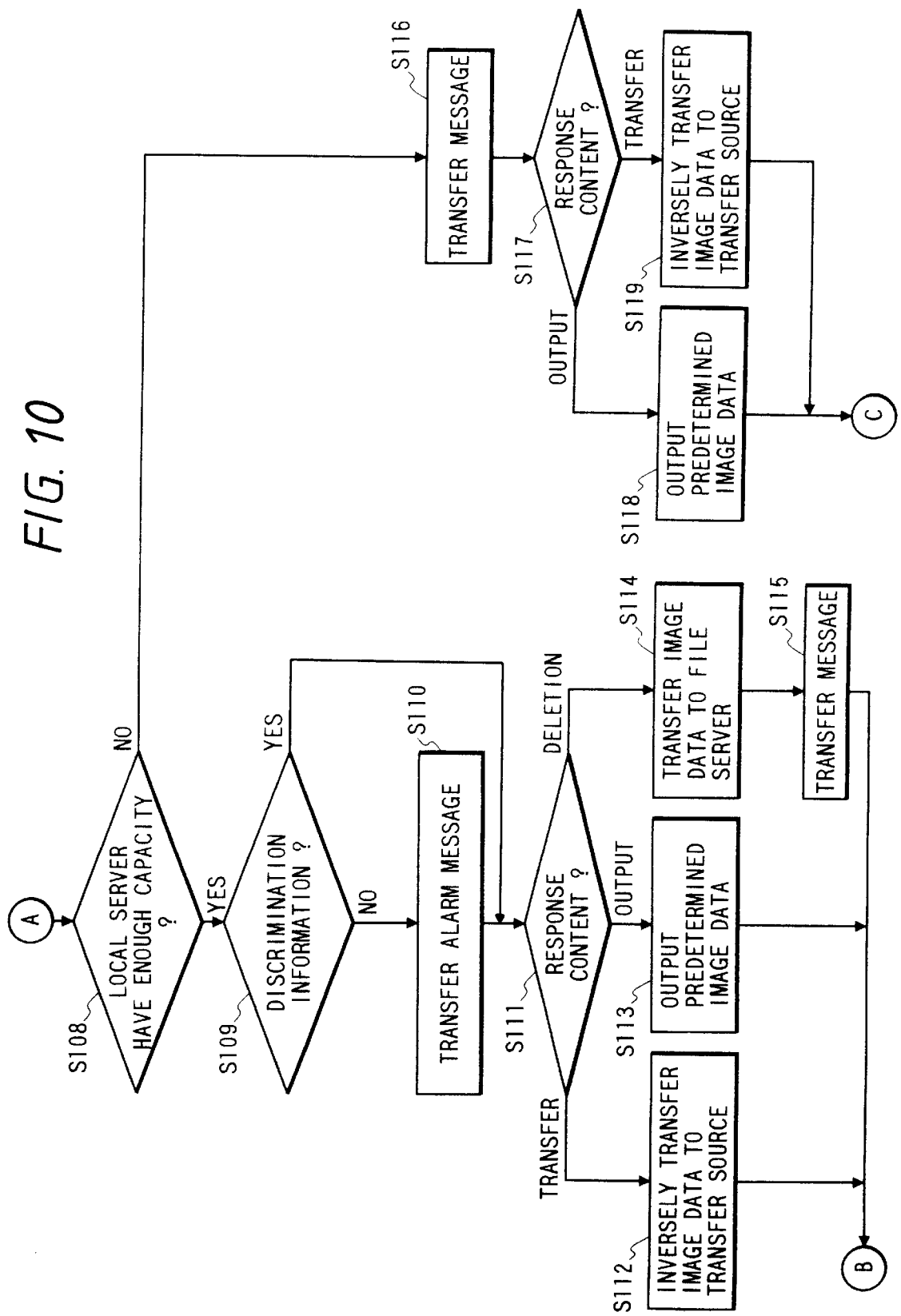
FIG. 10 is a flow chart showing procedure of the operation process of the image formation apparatus.

FIGS. 9 and 10 are flow charts showing the procedure of the operation process (i.e., the process based on the control by the CPU 133 of the core unit 308) of the image formation apparatus.

Initially, it is judged or observed whether or not the image data is transferred from the WS 7 or the PC 8 both connected to the LAN 6 to a local server (composed of the image memory unit 307 and the like) via the file server 9 (step S101).

In a case where the image data was transferred, it is then checked in the local server whether or not there is a vacancy which is enough to store the transferred image data (step S102). If there is the enough vacancy, the transferred image data is once stored in the local server provided in the image formation apparatus (step S103).

Subsequently, it is judged whether or not there is an output request for the image data stored in the local server (step S104). Such the output request is generated or produced when the copy start key 602 shown in FIG. 6 is depressed by an operator. Also, the output request can be generated by depressing the ten key 604 (i.e., by inputting a password or the like).

When the output request for the image data stored in the local server is generated, the operation state of the printer unit 2 is checked. Then, if the printer unit 2 is free, the image data is transferred to the printer unit 2 to be output on the sheet as the visible image (steps S105 and S106). As an output from at that time, there can be performed additional processes (e.g., stapling, sorting, both-face image forming, size reducing and the like) which are substantially the same as those in case of copying the ordinary originals. In this case, if the printer unit 2 is performing the previous process, e.g., outputting of the facsimile-received image data, when the copy start key 602 is depressed, the transferred image data is output after the presently-performing process terminated. When the image data stored in the local server was output from the printer unit 2, such the image data is automatically deleted in the local server (step S107).

On the other hand, if it is judged in the step S102 that there is no enough vacancy in the local server, it is then judged or checked whether or not the image data which has not been requested to be output though a predetermined time elapsed (e.g., one day or few hours) after the image data was input (or stored) in the local server (step S108).

In a case where there is the image data which has not been requested to be output for the predetermined time in the local server, it is then judged or checked in the local server whether or not there is discrimination information which represents importance of the contents of such the image data (step S109). As the discrimination information, there have been provided the processing contents, e.g., representing either one of transferring, outputting and deleting (or discarding), which are to be performed when the output of the stored image data is not performed within the predetermined time, and then the image data is processed on the basis of such the contents.

In a case where the image data which has not been requested to be output for the predetermined time does not have any discrimination information, the WS 7 or the PC 8 of the transmission source (or transfer source) of such the image data is discriminated, and then an alarm message is sent or transmitted to the WS 7 or the PC 8 of such the transmission source (step S110). As the alarm message, e.g., "transfer", "output" or "deletion (or discard)" is transmitted. Then, such the image data is processed on the basis of a response from the transmission source to which the alarm message was sent.

In a case where the transmission source of the image data which received the alarm message desires to transfer (i.e., evacuate) the image data, the transmission source instructs "transfer" by using the WS 7 or the PC 8. Further, in a case where the transmission source desires to output the image data, the transmission source instructs "output". Furthermore, in a case where the image data may be deleted, the transmission source instructs "deletion". On the other hand, if there is no response to the alarm message from the transmission source, it is considered that the transmission source instructs "deletion", and then the corresponding image data is processed according to such "deletion" instruction (step S111).

In the case where the response to the alarm message is "transfer" or in the case where the discrimination information represents "transfer", the corresponding image data is transferred (or returned) to the transmission source (step S112), whereby the corresponding image data is deleted in the local server (step S107). In the case where the response to the alarm message is "output", in the case where there is no response, or in the case where the discrimination information represents "output", the corresponding image data is read from the local server and then forcedly output (step S113). As such an output method at that time, if the printer unit 2 is operating for other process, the printing is performed after the printer unit 2 became free. On the other hand, if the printer unit 2 does not operate, the printing is performed immediately. When the output of the image data normally terminated, the corresponding image data is deleted in the local server (step S107).

Further, in the case where the response to the alarm message is "deletion" or in the case where the discrimination information is "deletion", the corresponding image data is transferred to the large-capacity file server 9 which is connected to the LAN 6 (step S114), and then the core unit 308 transmits to the WS 7 or the PC 8 of the image data transmission source the message for notifying that the corresponding image data has been transferred to the file server 9 on the LAN 6 (step S115). When the transfer of the image data to the file server 9 connected to the LAN 6 terminated, the corresponding image data is deleted in the local server (step W107).

In a case where the enough vacancy could be provided in the local server as a result of the processes in the steps S108 to S115, the presently-transmitted image data (i.e., transmitted at this time) is stored in the local server. Then, in the same manner as that in the case where the local server originally has the enough vacancy, the stored image data is output in response to the operator's output request by depressing the copy start key 602 or the like.

On the other hand, if it is judged in the step S108 that there is no corresponding image data in the local server, a message is transmitted to the WS 7 or the PC 8 of the transmission source of the presently-transmitted image data (step S116). As such the message, e.g., "transfer" or "output" is transmitted (step S117). The transmission source which received the message instructs to output the image data in case of forcedly outputting the image data (step S118). On the other hand, the transmission source instructs to transfer the image data in case of interrupting or stopping the process (step S119). In the case where it is instructed to forcedly output the image data, the transmitted image data is not once stored in the local server but is directly output to the printer unit 2.

The discrimination information may include the time elapsing after the image data was stored in the local server which time is obtained by comparison in the case where the stored image data is not output, whereby the desired time is set for each image data. Further, the operator arbitrarily sets such the time by using the ten key 604 illustrated in FIG. 6. Therefore, such the time can be arbitrarily set in accordance with the storage capacity of the local server. Furthermore, in case of outputting the image data stored in the local server, all the image data which exceed the setting time may be output, or only the image data according to the magnitude or size of the received image data may be output. Therefore, the local server can be used in accordance with various purposes.

The present invention can be applied to a system constructed by a plurality of equipments (e.g., host computer, interface equipment, reader, printer and the like) or can be also applied to an apparatus comprising one equipment (e.g., copy machine, facsimile machine).

The invention employed by a method whereby program codes of a software to realize the functions of the foregoing embodiments are supplied to a computer in an apparatus or a system connected to various devices so as to make the devices operative in order to realize the functions of the foregoing embodiments and the various devices are operated in accordance with the programs stored in the computer (CPU or MPU) of the system or apparatus is also included in the scope of the present invention.

In such a case, the program codes themselves of the software realize the functions of the foregoing embodiments, and the program codes themselves and means for supplying the program codes to the computer, e.g., a memory medium in which the program codes have been stored construct the present invention.

As such a memory medium to store the program codes, e.g., it is possible to use a floppy disk, a hard disk, an optical disk, an optomagnetic disk, a CD-ROM, a magnetic tape, a nonvolatile memory card, a ROM or the like can be used.

It will be obviously understood that the program codes are included in the embodiments of the present invention even in not only a case where the functions of the foregoing embodiments are realized by executing the supplied program codes by the computer but also a case where the functions of the foregoing embodiments are realized in cooperation with an OS (operating system) by which the program codes operate in the computer or another application software or the like.

Further, it will be also obviously understood that the present invention also incorporates a case where the supplied program codes are stored into a memory provided for a function expansion board of a computer or a function expansion unit connected to a computer and, after that, a CPU or the like provided for the function expansion board or the function expansion unit executes a part or all of the actual processes on the basis of instructions of the program codes, and the functions of the foregoing embodiments are realized by the processes.

Although the present invention has been described above with respect to the preferred embodiments, the present invention is not limited to the foregoing embodiments but many modifications and variations are possible with the spirit and scope of the appended claims.

What is claimed is:

1. A data processing apparatus comprising:

connection means for connecting said apparatus to a network capable of connecting a plurality of devices;

input means for inputting print data sent from a transmission source on the network via said connection means;

memory means for storing the print data input by said input means;

output means for outputting the print data stored in said memory means to a printer, by a predetermined print instruction;

judgment means for measuring a time and judging based on the measured time whether the print data not yet output by said output means exists in said memory means after the elapse of a predetermined time period since the print data input by said input means was stored in said memory means; and transfer means for transferring, in a case where said judgment means judged that the print data had not yet been output after the predetermined time has elapsed, the print data stored in said memory means to another device, in response to the judgement result by said judgment means.

2. An apparatus according to claim 1, wherein said transfer means transfers the data via said connection means to said transmission source.

3. An apparatus according to claim 1, wherein said transfer means transfers the data stored in said memory means to a memory device on the network via said connection means.

4. An apparatus according to claim 1, further comprising discrimination means for discriminating discrimination information included in the data input by said input means, and wherein said transfer means transfers the data stored in said memory means, in accordance with the discrimination information.

5. A data processing apparatus comprising:

input means for inputting data from a transmission source;

memory means for storing the data input by said input means;

output means for outputting the data stored in said memory means, by a predetermined operation;

judgment means for measuring a time and judging, based on the measured time, whether data not yet output by said output means exists in said memory means after the elapse of a predetermined time period since the data input by said input means was stored in said memory means;

deletion means for deleting, in a case where said judgment means judged that there is data not yet output after the predetermined time has elapsed, the data stored in said memory means;

informing means for sending an informing message to said transmission source; and discrimination means for discriminating a remaining free capacity of said memory means;

wherein said deletion means controls execution of the data deletion in accordance with a response to said informing message and a discriminated result of said discrimination means.

6. An apparatus according to claim 5, wherein said deletion means deletes the data stored in said memory means, after forcedly outputting the stored data by said output means.

7. A data processing apparatus comprising:

connection means for connecting said apparatus to a network capable of connecting a plurality of devices;

input means for inputting data sent from a transmission device on the network via said connection means;

memory means for storing the data input by said the input means;

output means for outputting the data stored in said memory means, by a predetermined operation;

judgment means for measuring a time and judging whether data not yet output by said output means exists in said memory means after the elapse of a predetermined time period since the data input by said input means was stored in said memory means based on the measured time;

discrimination means for discriminating discrimination information included in the data input by said input means, transfer means for transferring, in a case where said judgment means judged that there is the data not yet output after the predetermined time has elapsed, the data stored in said memory means to the transmission device or another device, wherein said transfer means determines the destination in accordance with the discrimination information and transfers the data stored in said memory means determined the destination.

8. The data processing apparatus of claim 7 further comprising:

connection means for connecting said apparatus to a network capable of connecting a plurality of devices.

9. A method for processing data comprising:

connecting a data processing apparatus to a network capable of connecting a plurality of devices;

inputting data from a transmission source on the network;

storing the data in a memory;

outputting the data stored in the memory, by a predetermined operation;

measuring a time and determining if data in the memory has not been outputted after the elapse of a predetermined time period since the data was received in the memory based on the measured time;

discriminating discrimination information included in the data; and transferring the data stored in the memory to the transmission source or another device, if it is determined that the data in memory has not been outputted after the elapse of a predetermined time period;

wherein said transferring determines the destination in accordance with the discrimination information and transfers the data stored in the memory device.

10. The method of claim 9, further comprising the step of:

connecting to a network capable of collecting a plurality of devices.

11. A computer readable program, stored in a storage medium, for controlling a data processing apparatus, said program comprising:

a connection step of connecting said apparatus to a network capable of connecting a plurality of devices;

an input step of inputting data sent from a transmission device on the network;

a storing step of storing the data into a memory device;

an output step of outputting the data stored in the memory device, upon occurrence of a predetermined operation;

a judgment step of measuring a time and judging whether data not yet output in said output step exists in said memory device after the elapse of a predetermined time period since the data input in said input step was stored in the memory device based on the measured time;

a discrimination step of discriminating discrimination information included in the data;

a transfer step of transferring, in a case where said judgment step judged that there is data not yet output for the predetermined time, the data stored in the memory device to the transmission device or another device;

wherein said transfer step determines the destination in accordance with the discrimination information and transfers the data stored in the memory device.

12. The computer readable program of claim 11, further comprising:

a step of connecting to a network capable of connecting a plurality of devices.

13. A computer readable program, stored in a storage medium, for controlling a data processing apparatus, said program comprising:
- a connection step of connecting said apparatus to a network capable of connecting a plurality of devices;
- an input step of inputting print data sent from a transmission source on the network;
- a storing step of storing the print data into a memory device;
- an output step of outputting the print data stored in the memory device to a printer, on the basis of a predetermined print instruction;
- a judgment step of measuring a time and judging whether the print data not yet output in said output step exists in said memory device after the elapse of a predetermined time period since the print data input from the transmission source was stored in the memory device based on the measured time; and
- a transfer step of transferring, in a case where said judgment step judged that there is the print data not yet output after the predetermined time has elapsed, the print data stored in the memory device to another device, in response to the judgment result in said judgment step.

14. A computer readable program, stored in a storage medium, for controlling a data processing apparatus, said program comprising:
- an input step of inputting data from a transmission source;
- a storing step of storing the data input into a memory device;
- an output step of outputting by an output device the data stored in the memory device, on the basis of a predetermined operation;
- a judgment step of measuring a time and judging whether data not yet output by the output device exists in said memory device after the elapse of a predetermined time period since the data input from the transmission source was stored in the memory device based on the measured time;
- a deletion step of deleting, in a case where the judgment step judged that there is data not yet output after the predetermined time has elapsed, the data stored in the memory device;
- an informing step of sending an informing message to said transmission source; and
- a discrimination step of discriminating a remaining free capacity of said memory deice;
- wherein the deletion step of deleting controls execution of the data deletion in accordance with a response to the informing message and a discriminated result in said discrimination step.

15. A method for processing data comprising:
receiving print data from a transmission source on the network;
storing the print data in a memory;
outputting the print data stored in said memory upon occurrence of a predetermined print instruction;
measuring time and judging whether the print data not yet output in said output step exists in said memory after the elapse of a predetermined time period since the print data received from the transmission source was stored in the memory based on the measured time; and
transferring the print data stored in said memory to another device in response to the judgment result in said judgment step if the print data in said memory is judged to not have been outputted after a predetermined time period.

16. A method for processing data comprising:
receiving data from a transmission source via a network;
storing the data in a memory;
outputting the data stored in said memory upon occurrence of a predetermined operation;
measuring a time and sending an informing message to said transmission source if the data in said memory has not been outputted after the elapse of a predetermined time period since the data was stored in said memory based on the measured time;
deleting the data in said memory in accordance with a response to said informing message; and
discriminating a remaining free capacity of said memory;
wherein said deleting controls execution of the data deletion in accordance with a response to said informing message and a discriminated result of said discriminating.

17. A data processing apparatus comprising:
input means for inputting data;
memory means for storing the data input by said input means;
output means for outputting the data stored in said memory means, by a predetermined operation;
judgment means for measuring a time and judging whether data not yet output by said output means exists in said memory means after the elapse of a predetermined time period since the input data was stored in said memory means based on the measured time;
discrimination means for discriminating a remaining free capacity of said memory means;
deletion means for deleting, in a case where said judgment means judged that the data has not yet been output for the predetermined time, the data stored in said memory means;
wherein said deletion means controls deletion of the data in accordance with a discriminated result of said discrimination means.

18. A method for processing data comprising:
inputting data from a transmission source;
storing the data in a memory;
outputting the data stored in said memory, by a predetermined operation;
measuring a time and determining if data in said memory has not been outputted after the elapse of a predetermined time period since said data was stored in said memory based on the measured time;
discriminating a remaining free capacity of said memory,
transferring the data stored in said memory to another device in accordance with the remaining free capacity of said memory, if it is determined that the data has been stored in said memory for longer than said predetermined time period.

19. A computer readable program, stored in a storage medium, for controlling a data processing apparatus, said program comprising:
an input step of inputting data;
a storing step of storing the data into a memory device;
an output step of outputting by an output device the data stored in the memory device, on the basis of a predetermined operation;

a judgment step of measuring a time and judging whether data not yet output by the output device exists in said memory device after the elapse of a predetermined time period since the input data was stored in the memory device based on the measured time;

a discrimination step of discriminating a remaining free capacity of said memory;

a transfer step of transferring, in a case where said judgment step judged that there is data not yet output for the predetermined time, the data stored in the memory device to another device in accordance with a discriminated result of said discrimination step.

* * * * *